No. 712,241. Patented Oct. 28, 1902.
G. BARNES.
ANIMAL POKE.
(Application filed June 26, 1901.)
(No Model.)

Witnesses
T. W. Riley
B. Funk

Inventor
Guy Barnes,
By Victor J. Evans
Attorney

UNITED STATES PATENT OFFICE.

GUY BARNES, OF MILTON, KANSAS.

ANIMAL-POKE.

SPECIFICATION forming part of Letters Patent No. 712,241, dated October 28, 1902.

Application filed June 26, 1901. Serial No. 66,123. (No model.)

*To all whom it may concern:*

Be it known that I, GUY BARNES, a citizen of the United States, residing at Milton, in the county of Sumner and State of Kansas, have invented new and useful Improvements in Animal-Pokes, of which the following is a specification.

This invention relates to animal-pokes; and the primary object thereof is to provide a device of the character described which will effectually prevent an animal to which the invention is applied from spreading the line-wires of the fence should the animal attempt to escape.

A further object is to provide a device which will be adjustable for different-size animals.

Further objects, as well as the peculiar construction, of this invention will be described hereinafter and recited in the accompanying claim.

Figure 1:
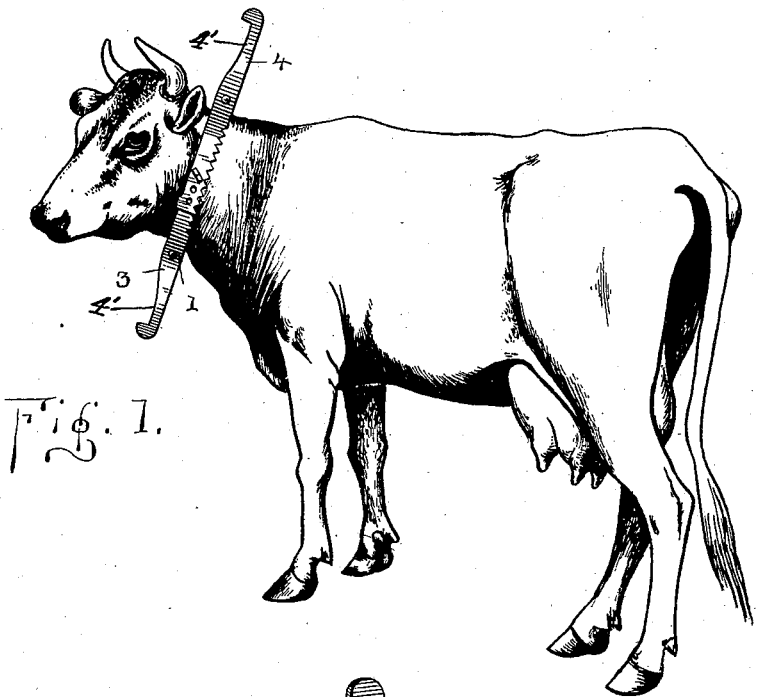
Figure 2:
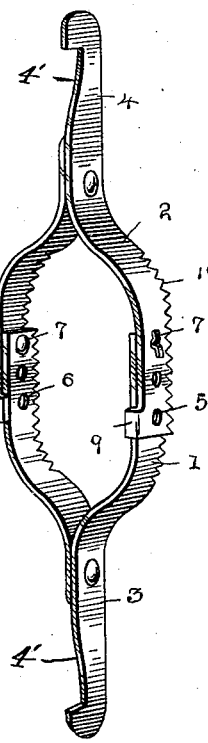
Figures 3, 4:
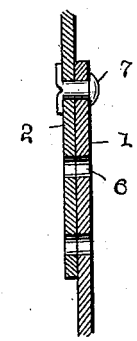

In the drawings, Figure 1 shows a side elevation of the invention. Fig. 2 is a perspective view of the same detached. Fig. 3 shows a cross-section. Fig. 4 shows a longitudinal section.

Referring now to the drawings by numerals of reference, 1 and 2 designate the two half-collars of the yoke which is fitted over the neck, and each of these half-collars is provided with an end extension or bar, (designated by the reference-numerals 3 and 4.) On the end of each bar is a hook to engage the line-wires of the fence and prevent same from spreading.

Near the bifurcated ends of the respective collar-sections I provide a row of perforations or holes 5 and 6, which register with each other and which are designed to receive rivets or bolts 7, whereby the respective sections may be adjusted one upon the other, the limit of adjustment being covered by the number of holes in the ends of said sections.

On the section 2 I provide two right-angular stops or flanges 8 and 9, one on each end of the bifurcated arms which bear against the edge of the section 1 to limit the outward movement of both of the collar-sections and incidentally the bars.

On the inner edge portions of the extensions 3 and 4 are formed inclines 4', which serve the purpose of guiding the upper and lower wires of a fence-panel to the hooks by the sliding action of the wires on said inclines. This operation occurs when the animal runs its head between an upper and lower wire, and by means of pressure of the wires on the inclines the engagement of the wires with the hook ends of the extensions is accomplished, as hereinbefore stated. I wish it to be understood that I construct each collar-section of a sufficient width to permit of the rear edges thereof having rows of serrations 10, the same being struck directly from said edge, thereby saving material and at the same time doing away with such devices being connected intermediately with the collar-sections, and by my construction I obviate the same from getting out of order, as such would be the case if the pricking devices were attached to the neck-sections. I further attach importance to the construction of the serrations for the reason that when they come in contact with the neck of an animal to prick the same they will not bend or break, owing to their rigidity, as the same forms a part of the sections on which they are made. Further, if the same were constructed in prong shape and attached to the neck-sections the bending and breaking of the same would occur.

From the above it will be seen that I have provided a cheap, durable, and efficient animal-poke which will readily perform the service for which it is intended.

Having thus fully described my invention, what I claim, and desire to secure by Letters Patent, is—

An animal-poke comprising flat strips of metal bent to form neck-yoke sections having on opposite ends extensions provided on their inner edges with inclines which terminate in hook ends, the inner ends of the neck-sections having perforations which are pivotally and adjustably secured together by means of rivets, and stops formed on the opposite edges of one of the sections to coact with opposite edges of the other section, said neck-sections having continuous rows of serrations thereon and integrally therewith and in the inner edges thereof, substantially as specified.

In testimony whereof I affix my signature in presence of two witnesses.

GUY BARNES.

Witnesses:
D. C. HANDY,
E. B. LANE.